United States Patent
Anschutz

(10) Patent No.: US 8,594,665 B2
(45) Date of Patent: Nov. 26, 2013

(54) COMMUNICATION DEVICES THAT UTILIZE VARIOUS COMMUNICATION NETWORKS TO SATISFY COMMUNICATION NEEDS OF DEVICE APPLICATIONS

(75) Inventor: Thomas Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1239 days.

(21) Appl. No.: 11/845,761

(22) Filed: Aug. 27, 2007

(65) Prior Publication Data

US 2009/0061853 A1    Mar. 5, 2009

(51) Int. Cl.
*H04W 4/00* (2009.01)

(52) U.S. Cl.
USPC ........ 455/434; 455/420; 455/425; 455/127.4; 370/328; 709/221; 709/209

(58) Field of Classification Search
USPC ........... 455/127.4, 435.2, 438, 420, 425, 434, 455/414.1, 418, 423; 370/328–338; 709/221, 209
See application file for complete search history.

(56) References Cited

U.S. PATENT DOCUMENTS

| | | | |
|---|---|---|---|
| 5,428,666 A | 6/1995 | Fyfe et al. | |
| 5,734,980 A | 3/1998 | Hooper et al. | |
| 5,764,730 A | 6/1998 | Rabe et al. | |
| 5,987,325 A | 11/1999 | Tayloe | |
| 6,122,514 A * | 9/2000 | Spaur et al. | 455/448 |
| 6,178,335 B1 | 1/2001 | Vu | |
| 6,185,436 B1 | 2/2001 | Vu | |
| 7,136,368 B2 | 11/2006 | Inoue | |
| 7,161,897 B1 | 1/2007 | Davies et al. | |
| 7,200,401 B1 * | 4/2007 | Hulkkonen et al. | 455/438 |
| 2002/0087674 A1 * | 7/2002 | Guilford et al. | 709/223 |
| 2005/0059397 A1 * | 3/2005 | Zhao | 455/435.2 |
| 2005/0256732 A1 * | 11/2005 | Bauer et al. | 705/1 |
| 2006/0233318 A1 * | 10/2006 | Ashley et al. | 379/45 |

* cited by examiner

*Primary Examiner* — Mahendra Patel
*Assistant Examiner* — Quan M Hua
(74) *Attorney, Agent, or Firm* — Parks IP Law LLC; Jennifer P. Medlin, Esq.

(57) ABSTRACT

Communication devices may utilize services of multiple communication networks to obtain service for the various applications that the communication device provides. The communication device and/or one or more communication networks may determine which network is best suited to each application based on dynamic information regarding the service provided by each communication network. The application may be associated with a network at various times, such as upon the communication device encountering a network that supports a service needed by the application and/or upon initial invocation of the application. The communication device may be communicating with several communication networks simultaneously so that a single application may make use of multiple communication networks and/or so that multiple applications may each utilize different networks.

20 Claims, 6 Drawing Sheets

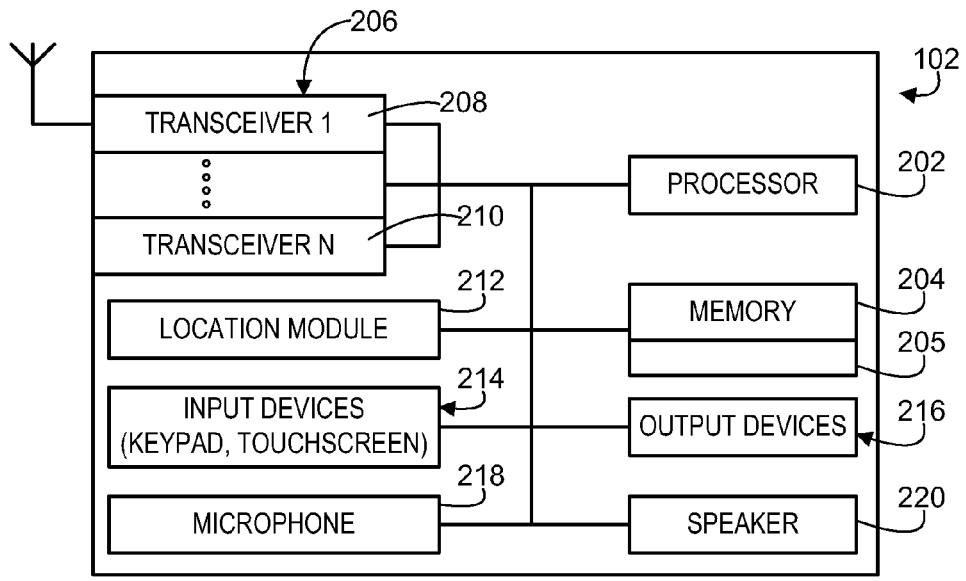
FIG. 2
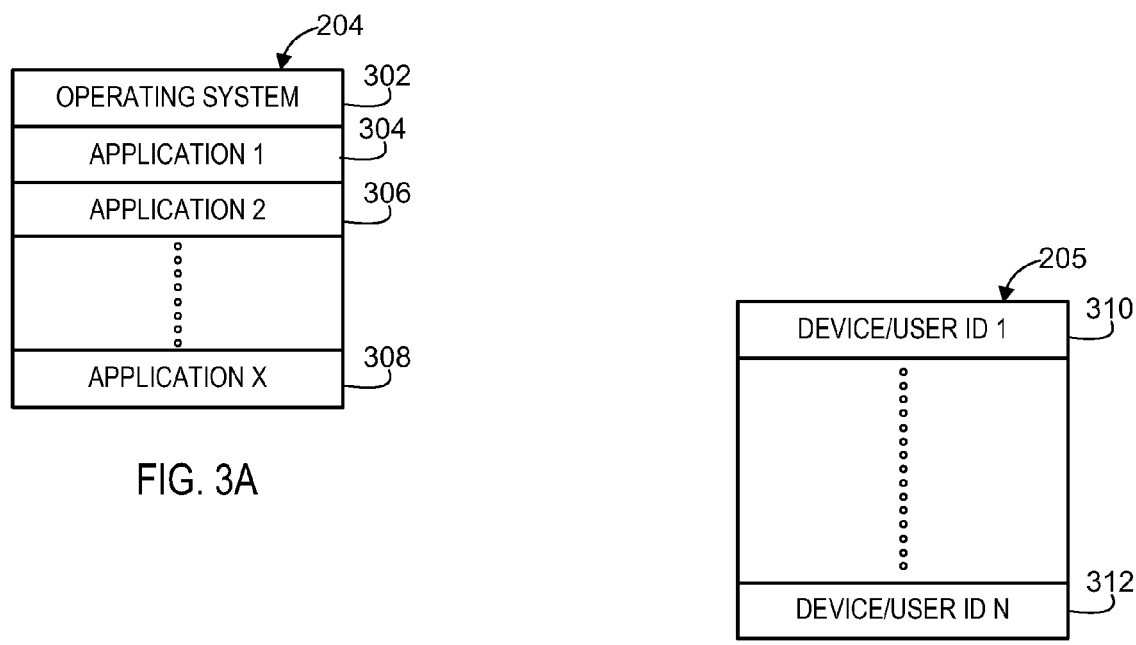
FIG. 3A
FIG. 3B

COMMUNICATION DEVICES THAT UTILIZE VARIOUS COMMUNICATION NETWORKS TO SATISFY COMMUNICATION NEEDS OF DEVICE APPLICATIONS

TECHNICAL FIELD

Embodiments disclosed herein relate to communication devices and networks. More particularly, embodiments relate to communication devices that provide applications and that communicate with various communication networks to satisfy the communication needs of those applications.

BACKGROUND

Communication devices such as cellular telephones, personal digital assistants (PDAs), and the like provide one or more applications that may be implemented on behalf of the user. For example, communication devices may employ a voice call application that allows the user to place a voice telephone call to remote parties. As other examples, communication devices may employ text messaging applications, web browsing applications, gaming applications, virtual private networking, terminal services, and so forth.

Each of these various applications being provided may have constraints that dictate how well the application will function and whether it will function at all. For example, a voice call application may be considered to perform best when transmission errors are minimized at the expense of data throughput so that re-tries of data transmissions are seldom necessary. As another example, text messaging may be considered to perform best when the connection is the least expensive, at the expense of data throughput and transmission errors. As another example, web browsing may be considered to perform best when data throughput is at its highest, at the expense of cost for the connection.

Communication devices that implement these applications make use of whatever service quality is available at a given time from the communication network to which the communication device is currently registered. This current communication network is typically the native communication network for the device, i.e., the network operated by the entity through which the user has purchased communication service. However, where the native communication network is unavailable due to a lack of signal strength, then the current communication network through which the communication device attempts to communicate for the application may be a roaming network operated by an entity that has a roaming agreement in place with the entity that operates the native network. In either case, the communication device is limited by what level of service that current network provides.

SUMMARY

Embodiments provide for communication devices that may utilize multiple communication networks to satisfy communication needs of applications being provided. The communication device may be registered at any given time with multiple networks where the communication device utilizes certain networks for communications for particular applications. According to some embodiments, the communication device may employ rules to analyze dynamic service criteria of the available networks versus requirements of the various applications to match applications to networks. According to some embodiments, the communication device may rely upon dynamic information provided to it from a native or roaming network, where the dynamic information may be either an instruction regarding which network to associate with an application or current information specifying the service criteria of the available networks.

According to various embodiments, a communication device may include at least one wireless transceiver in communication with a plurality of communication networks. The communication device may further include a processor that implements a plurality of applications that utilize wireless communications via the wireless transceiver. The processor makes a determination on an application-by-application basis as to which communication network to communicate by applying rules and dynamic information that specifies signal characteristics for the plurality of communication networks According to various embodiments, a communication device may include at least one wireless transceiver in communication with a plurality of communication networks. The communication device may further include a processor that utilizes wireless communications via the at least one wireless transceiver. The processor receives dynamic information that comprises at least one of signal characteristics, topological characteristics, network characteristics, application characteristics, and reliability characteristics regarding the plurality of communication networks such that the processor establishes communications for at least one application with a particular communication network of the plurality by applying rules relative to the dynamic information received about the plurality of communication networks.

According to various embodiments, a computer readable medium contains instructions that cause a communication device implementing a plurality of applications to perform acts. The acts include establishing contact with a plurality of communication networks and receiving dynamic information that specifies signal characteristics for the plurality of communication networks from at least one of the plurality of communication networks. The acts further include applying rules relative to the received dynamic information to make a determination on an application-by-application basis as to which communication network to utilize. Additionally, the acts include establishing communications for at least one of the applications with a particular communication network of the plurality based on the application of the rules relative to the dynamic information received.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

FIG. 2 shows an example of a communication device capable of communicating with various communication networks for purposes of implementing various applications.

FIG. 3A shows an example of contents of memory or other storage of a communication device for implementation of various applications.

FIG. 3B shows an example of additional contents of memory or other storage of a communication device for communication with a variety of communication networks.

DETAILED DESCRIPTION

Embodiments provide for communication devices to utilize multiple communication networks for the communication needs of the various applications provided by the communication devices. The communication devices may thereby employ the communication networks that are best suited for particular applications rather than relying on a single communication network to handle all communication needs.

Figure 1:
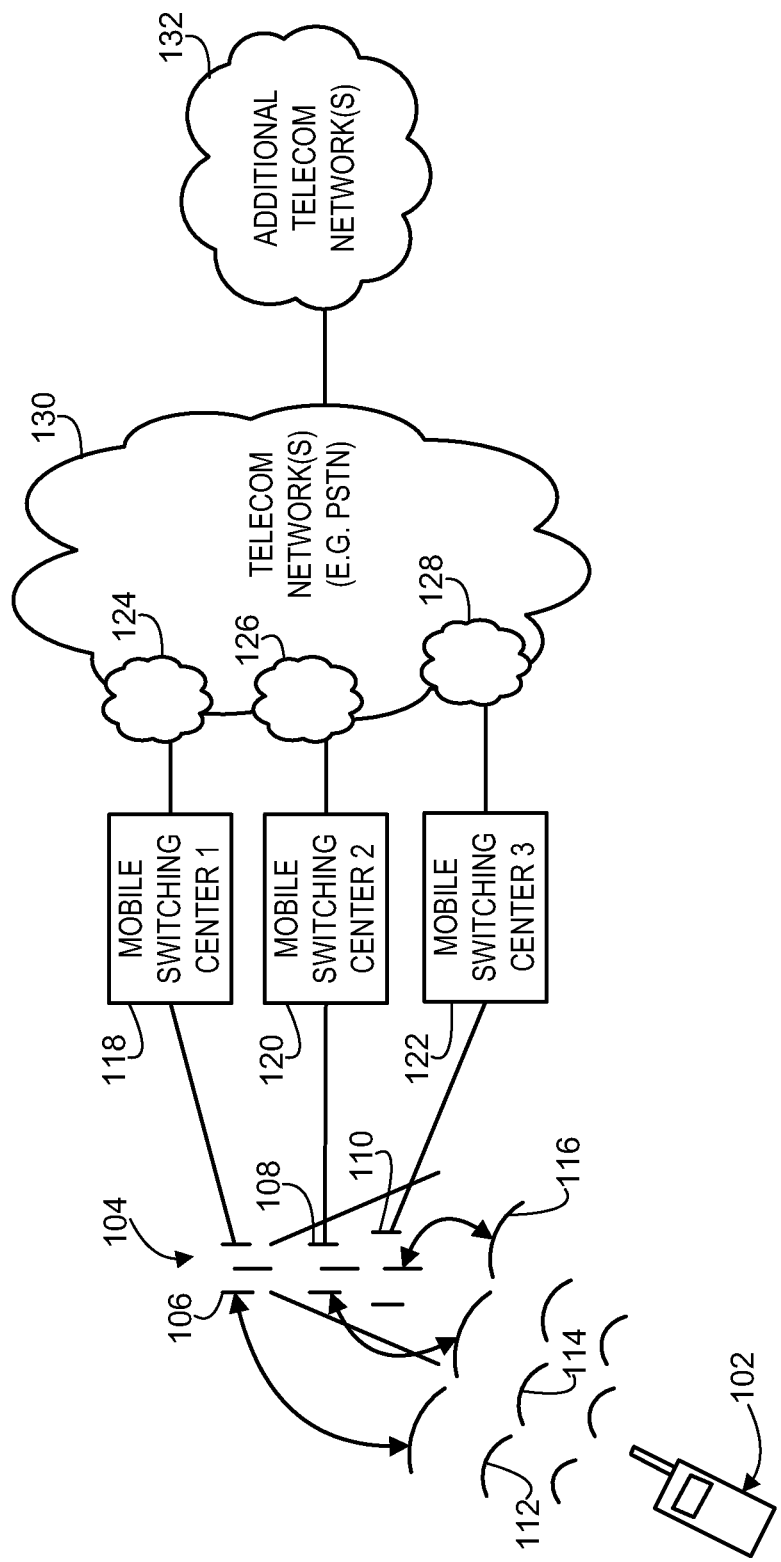
FIG. 1 shows an environment where multiple communication networks are available to a communication device implementing various applications.

FIG. 1 shows an environment for various embodiments of a communication device 102. The communication device 102 communicates with a plurality of communication networks 124, 126, 128 by exchanging wireless signals 112, 114, 116 with antennae 106, 108, 110 of one or more tower/base station structures 104 that are within wireless range. Switching centers 118, 120, 122 in communication with one or more of the tower/base stations 104 serve as the entry to each of the communication networks 124, 126, 128. The communication networks available to the communication device 102 may be mobile communication networks such as cellular networks of various types, nomadic communication networks such as those based on Bluetooth® protocol, 802.11 (Wi-Fi), and Wi-Max, and even wireline networks The communication networks 124, 126, 128 may be interconnected to various additional telecommunication and/or data networks 130, 132, such as the public switched telephone network (PSTN), the Internet, private networks, long distance networks, mobile communication networks, and so forth. Other embodiments allow for the device 102 to communicate with a switching center, such as the switching enter 122, using combinations of wireline and wireless access other than towers and base stations. For example, the radio signal 116 may be Wi-Fi and received using a public or private Access Point (AP) that facilitates communications with the switching center 122.

The transceiving antenna structures 106, 108, 110 of the tower/base station structure 104 may have differences that distinguish them. These transceiving antenna structures 106, 108, 110 may utilize different frequencies of the electromagnetic spectrum, may utilize different communication protocols, a combination of both, and so forth. For example, the antenna structure 106 may utilize the Global System for Mobile communications (GSM) which operates in at least a portion of the 800 and 1800 MHz ranges while utilizing time division multiple access (TDMA). Continuing this example, the antenna structure 108 may utilize GSM but in a different bank of the 800 and 1800 MHz frequencies. Alternatively, the antenna structure 108 may utilize an IEEE 802.11 protocol which operates in a number of channels at different frequencies. The antenna structure 110 of this example may utilize Personal Communications Services (PCS) which operates in the 1900 MHz range while utilizing protocols such as code division multiple access (CDMA). Thus, in various embodiments, the communication device 102 may include components that enable communication with the different frequencies and different protocols that are being employed.

During use of the communication device 102, various applications may be implemented such as voice calls, text messaging, web browsing, gaming, and so on. According to exemplary embodiments the communication device 102 establishes connectivity with the multiple communication networks 124, 126, and 128 and employs those networks for communications needed by the various applications being implemented on the device 102. For example, the device 102 may send and receive voice calls via the antenna 106, switching center 118, and corresponding network 124. In this example, the device 102 may send and receive text messages via the antenna 108, the switching center 120, and the corresponding network 126. Further in this example, the device 102 may surf the World Wide Web via the antenna 110, the switching center 122, and the corresponding network 128.

The communication device 102 may also utilize one of the communication networks 124, 126, 128 for multiple applications and/or may utilize multiple communication networks 124, 126, 128 for one application. For example, the device 102 may utilize the antenna 108, switching center 120 and the corresponding network 126 for text messages and also for electronic mail (email). Furthermore, in this example the device 102 may utilize the antennas 106 and 110, switching centers 118 and 122, and the corresponding networks 124 and 128 in a bonded fashion to support a gaming or other bandwidth intensive application.

In order for the communication device 102 to communicate with multiple communication networks in this manner, the device 102 presents one or more credentials, and these networks 124, 126, and 128 may recognize one or more of those credentials as being valid for authorizing use of the network for one or more available services. The authorization may exist at a network because the network is a native network for the device 102. The authorization may alternatively exist at a network because the network is a roaming network for the device 102. The device 102 may have a single native network but have many roaming networks available to it, as the native entity may have roaming agreements in place with many other entities. Furthermore, the device 102 may have many native networks, such as where the user of the device has purchased service from multiple entities, and may have additional roaming networks as well.

FIG. 2 shows components that may be present for an exemplary embodiment of the communication device 102. In this example, the communication device 102 includes a processor 202 that is linked to various additional components that the processor 202 interacts with or otherwise controls. The processor 202 may be a general purpose programmable processor, an application specific device such as hardwired digital logic, and/or combinations thereof. The processor 202 interacts with a memory device 204 which may include volatile and/or non-volatile storage and may store programming for the processor 202. The programming may include such items as an operating system and applications, data files such as photos, videos, text files, and the like. The processor 202 may also interact with a memory device 205, such as one or more fixed or removable subscriber identity module (SIM) cards or number assignment modules (NAM) that include the credentials such as telephone number and device serial number needed to register and obtain service with the various communication networks 124, 126, 128.

The processor 202 and memory 204, 205 are examples of computer readable media. Computer readable media may store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 202 interacts with one or more transceivers 206 to control the communications with the communication networks. The communication device 102 may include a first transceiver 208 that communicates according to certain frequencies and protocols while including other transceivers 210 that communicate according to different frequencies and/or protocols. Additionally or as an alternative, the communication device 102 may include a transceiver capable of communicating in multiple frequency ranges and according to multiple protocols. Additionally, one or more of the available transceivers 206 may be wireless and/or wireline transceivers, thereby given the communication device 102 the ability to utilize wireless and wireline based communication networks simultaneously.

The processor 202 may interact with a location module 212, such as a geonavigational positioning system (GPS) receiver, a triangulation module, and so forth which reports a current location of the communication device 102 to the processor 202. The processor 202 may utilize this information in embodiments where the communication device 102 analyzes various criteria to select the proper network for a given application. For example, in one particular geographical area, it may be known that one communication network is more reliable, cheaper, or faster than another such that the processor 202 may select that communication network based at least in part on the current location.

The processor 202 may interact with various input and output devices. For example, one or more input devices 214 such as keypads or touchscreens may be included to allow a user to provide input, such as to select applications, enter information, and so forth. One or more output devices 216 may be included, such as display screens and lights to provide visual information and feedback to the user.

The processor 202 may also interact with a microphone 218 to allow the user to speak during voice calls, record voice memos, utter verbal commands, and so forth. Likewise, the processor 202 may interact with a speaker 220 to provide audio to the user, such as the voice of a calling party, audible output from applications, and the like.

FIG. 3A shows one example of the contents of the memory 204. This memory 204 maintains the programming of the communication device 102. The memory 204 may be a permanently installed component or a removable component. Such programming may include an operating system 302 and various applications 304, 306, 308. As discussed above, the applications 304, 306, 308 may utilize wireless communications where the processor 202 interacts with the transceivers 206 to establish the necessary communications with the available communication networks 124, 126, 128.

FIG. 3B shows one example of the contents of the memory 205. This memory 205 maintains the device and user credentials that are provided by the processor 202 to the communication networks 124, 126, 128 when registering the communication device 102 for use of the one or more services available through the networks. The memory 205 may also be permanently installed or may be a removable component. For example, the memory 205 may include multiple memory components 310, 312 where each memory component itself is permanently installed or removable. The component 310 may be a removable SIM card while the component 312 may be a fixed NAM module or may be a second removable SIM. While FIG. 3B shows the multiple components 310, 312, the memory 205 may alternatively be a single component that stores multiple credentials needed for multiple networks, or may be a single component that stores a single set of credentials that are applicable to multiple networks. Furthermore, the memory 205 may be integrated into the memory 204 or may be a separate component.

Figure 4A:
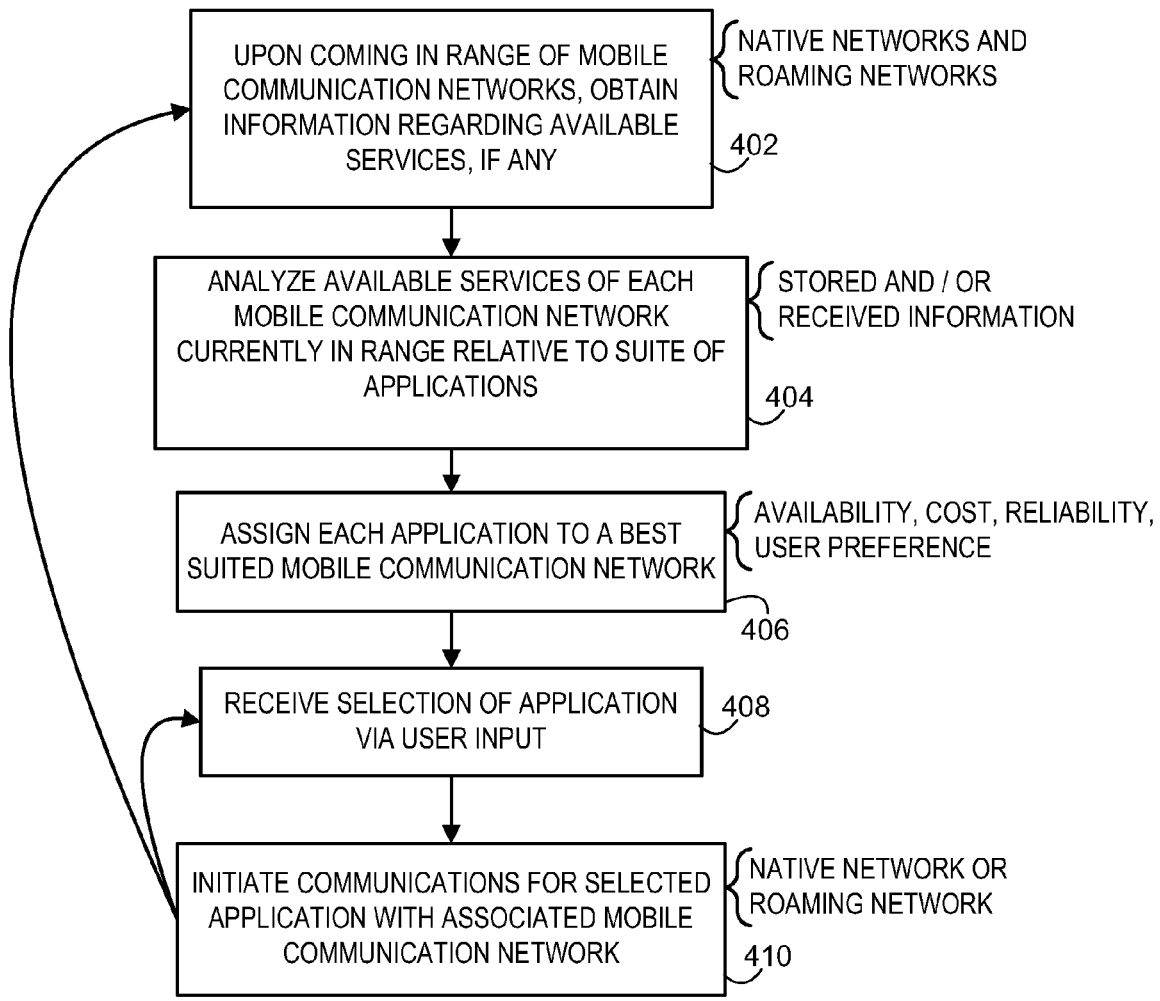
FIG. 4A shows examples of logical operations that may be performed by a communication device to select communication networks for applications.

FIG. 4A shows one example of logical operations that may be performed by the communication device 102 according to various embodiments to collect dynamic information about the available networks and services and to apply rules to select a particular network to employ for a given application. As discussed herein, dynamic information includes that information that changes with respect to time. Thus, examples of dynamic information include network presence information, i.e., information identifying which networks and services are currently present in the area where the communications device is located. Other examples of dynamic information include network desirability information, i.e., information identifying whether a network and the service that the network provides is desirable for a given application.

When determining whether a particular network that is currently available is desirable for a given application, various factors may be considered. For example, these factors may include signal characteristics, topological characteristics, network characteristics, application characteristics, and Volume or reliability characteristics.

Examples of signal characteristics include: strength, variability, adjacent channel disturbances, radio efficiency, and/or the ability of the signal to penetrate buildings or rain.

Examples of topological characteristics include: distance to base station, direction to base station, and/or speed of the communication device.

Examples of network characteristics include: voice quality, cost, interoperability, quality of service (QoS) or cost of service (CoS), the availability of different classes of service, data rate, cost, variability, and/or access control (data may be available only on a particular network).

Examples of application characteristics include: applications that may pick networks, applications that may measure tangible differences among networks like throughput, latency, packet loss, peak bandwidth, application tolerance to variability in available bandwidth, and/or application tolerance to a given frequency of congestion events.

Examples of volume or reliability characteristics include: ability of a communication device 102 to use of multiple networks for a given application or set of applications to add bandwidth (bonding), to avoid dropouts, to avoid packet loss, and/or to minimize cost (linear or because minutes or bytes are close to being exhausted.)

Thus, the desirability information may include the data necessary to determine which network is appropriate for a given application on the basis of one or more of these various factors. Furthermore, the desirability information may be instructions from a network to utilize that network or another for a given application, such as where the network has considered these factors rather than the communication device or where the network maintains a static association of the application to a network.

The communication device 102 performs these logical operations to consider information about available networks in order to most effectively assign applications to networks.

In this example, the device 102 pre-determines which network will be used for each application so that upon the application being used, the network to employ is already established and no delay should ensue. However, as discussed in subsequent figures, the communication device 102 may associate an application to a network upon the application being invoked for use.

Initially, the communication device 102 is brought into range of one or more communication networks, or is brought into range of additional communication networks at information operation 402 whereby the communication device learns which networks are available to it. In this example, the networks may be the native network(s) for the device 102, if any are in range, as well as any roaming networks for the device 102 that are in range. In alternative embodiments, the device 102 may obtain such information only from native networks. Upon encountering these networks, the device may query for service related dynamic information and/or the networks may be configured to submit such dynamic information as an automatic function upon initial communication with the communication device 102. In either case, service related dynamic information is provided from one or more networks to the communication device 102.

The dynamic information received by the communication device 102 may include data identifying the services of the network (e.g., TDMA, CDMA, EV-DO, EDGE, GPRS, HSDPA, 802.11 variations, Bluetooth profiles), that are available to support applications (e.g., voice, text, and so forth). At this point, the communication device 102 may proceed with registration (e.g., home location register (HLR) and/or visiting location register (VLR)) with whichever networks offer the basic services desired for applications, such as registering with EDGE networks where data applications are requesting service.

At this point, additional dynamic information may also be provided, such as information specifying a quality of service of each supported application, such as the current data throughput for the service to support an application, the current cost associated with using a service of the network to support a particular application, the reliability of the connection to the service of the network to support a particular application, and so on. For example, the network may specify that data connectivity is available, that available data throughput is currently of a certain level, and that the cost of data transfer is currently some amount per unit of data transferred. The network to provide the service may provide this information or another network such as a native network that maintains data of this type about itself and about other potentially available native and roaming networks may provide this information to the device 102. So for the example where registration has occurred with EDGE networks, the communication device 102 may then obtain this additional dynamic information from each EDGE network to determine which EDGE network to utilize for a given application at this point in time.

As an alternative to all of this dynamic information being provided from the networks to the device 102 upon the device 102 encountering the networks within its communication range, at least some of this information, such as that which tends to be constant over time, may be pre-positioned onto the device 102. For example, the device 102 may be manufactured with at least some of the information about the potentially available networks already stored in the memory 204. The memory 204 may be updated by being replaced or by being re-programmed with newer data such as during synchronization of the device 102 with a computer or with an encountered communication network. As discussed below with reference to subsequent figures, alternative embodiments may provide for such information, including dynamic and/or constant information, to be collected by the native network for analysis and for communicating a resulting list of network associations to applications to the device 102 rather than relying on the device 102 to maintain the information and perform the analysis.

In the example of FIG. 4A where the device 102 is collecting and/or storing the information about the networks including dynamic and/or constant information, the device 102 analyzes the available information about the encountered networks at analysis operation 404. Here, the device 102 considers which applications it currently provides and the rules for selecting networks for those applications in relation to the dynamic information that has been collected. For example, the device 102 may reference rules to determine that web browsing will require data throughput to exceed a certain throughput threshold while cost of data transfer is under a cost threshold and will then analyze each network to determine which of them meet these thresholds specified by the rules for web browsing.

The device 102 assigns each of its applications to a network at assignment operation 406. Here, the device 102 may decide which network to employ for an application on the basis of availability, costs, reliability, as well as other factors including user preference. For example, two networks may look equally suitable for an application, but the user or the entity operating the native network for the device 102 may have set a priority that instructs the device 102 to pick one of the two networks over the other. The associations of applications to networks are stored in memory of the device 102 for subsequent reference upon invocation of an application.

The device 102 invokes an application, such as at the request of the user or in the normal course of operation of the device 102, at selection operation 408. At this point the device 102 already has determined which network is suited to that application. Therefore, the device 102 then initiates communications with the associated network for this application at communication operation 410. In this example, the associated network may be a native or roaming network. In other examples, the device 102 may be restricted to only a native network or to a limited set of roaming networks. These logical operations of FIG. 4A repeat so that upon encountering new networks, information is received at information operation 402 and upon invocation of an application at selection operation 408, the associated network is then used. Thus, it can be seen that the device 102 may have many applications simultaneously in use and may be simultaneously communicating with multiple networks to satisfy the communication needs of those applications.

Figure 4B:
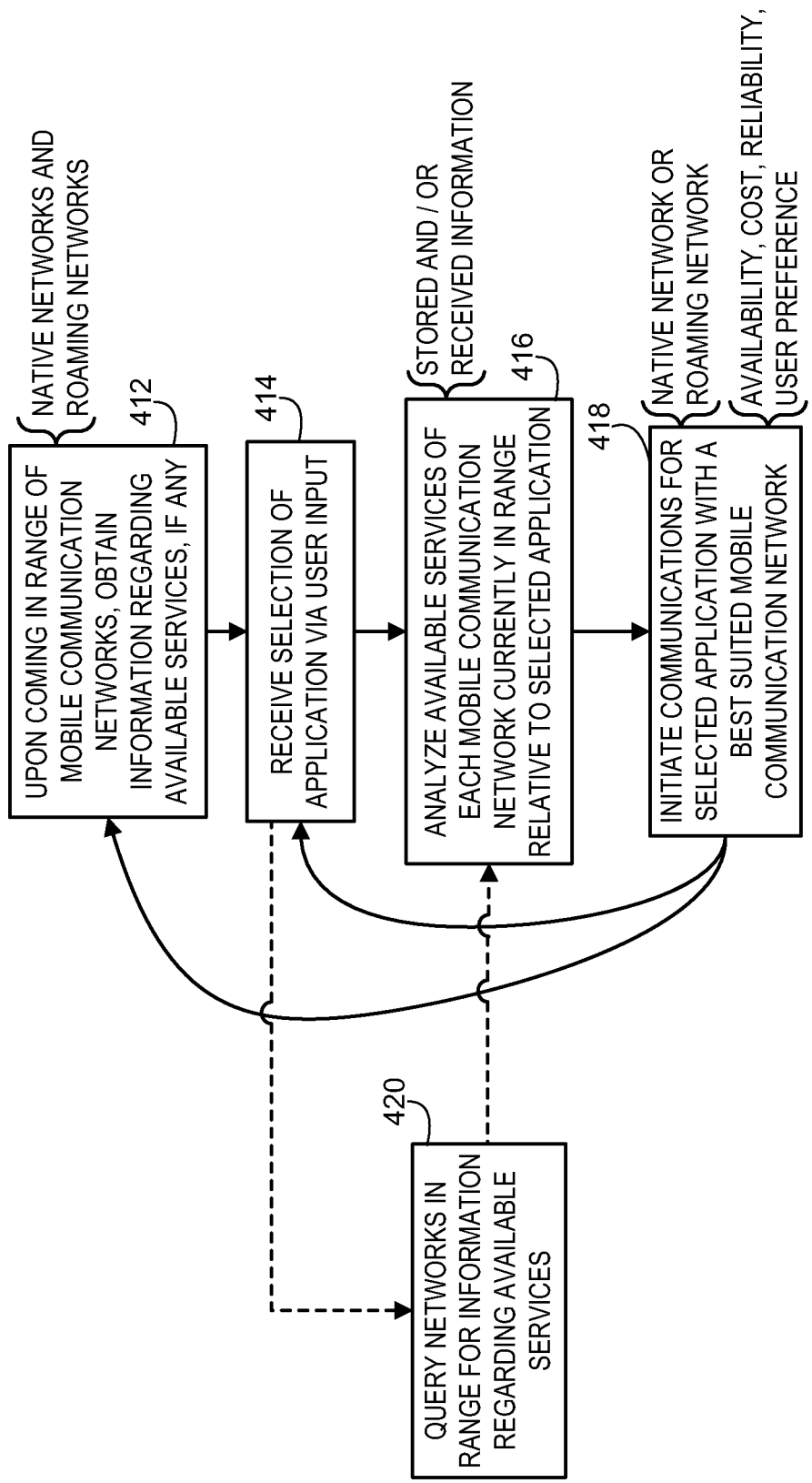
FIG. 4B shows other examples of logical operations that may be performed by a communication device to select communication networks for applications.

FIG. 4B shows another example of logical operations that may be performed by the communication device 102 according to various embodiments. The communication device 102 performs these logical operations to consider dynamic information about available networks in order to most effectively choose a suitable network at the time an application requiring communication services is invoked for use. Two separate options are shown in FIG. 4B in relation to obtaining information from the networks that are in range, where either or both may be employed in this particular example. The first option is shown with solid connecting arrows of the logical flow while the second option includes the dashed connecting arrows of the logical flow.

Initially and according to the first option, the communication device 102 is brought into range of one or more communication networks, or is brought into range of additional communication networks at information operation 412. In this example, the networks may be the native network(s) for the device 102, if any are in range, as well as any roaming networks for the device that are in range. In alternative embodiments, the device 102 may obtain such dynamic information only from native networks. Upon encountering these networks, the device 102 may query for service related dynamic information and/or the networks may be configured to submit such dynamic information as an automatic function upon initial communication with the device 102. In either case, service related dynamic information is provided from one or more networks to the device 102.

As discussed above in relation to FIG. 4A, the dynamic information received may include presence information such as data identifying the services of the available network (e.g., TDMA, CDMA, EDGE, etc.) that are available to support applications (e.g., voice, text, web, private networking, and so forth). Again, registration with those networks providing desirable services may occur via the HLR and/or VLR of the networks. Additional dynamic information, namely the desirability information, may also be provided, particularly after registration has occurred. This additional dynamic information may specify such things as a quality of service of each supported application, such as the current data throughput for the service to support an application, the current cost associated with using a service of the network to support a particular application, the reliability of the connection to the service of the network to support a particular application, and so on.

As with the example of FIG. 4A, the network to provide the service may provide this dynamic information or a native network that maintains data of this type about itself and about other potentially available networks may provide this information to the device 102. As an alternative to all of this dynamic information being provided from the networks to the device 102 upon the device 102 encountering the networks within its communication range, at least some information to be used to choose a network may be pre-positioned onto the device 102 in this example as well.

In the example of FIG. 4B, the device 102 then invokes an application, such as at the request of the user or in the normal course of operation of the device 102, at selection operation 414. At this point the device 102 has not yet determined which network is suited to that application. Therefore, according to the first option, the device 102 then analyzes the available dynamic information about the encountered networks at analysis operation 416. Here, the device considers the communication requirements of the application that has been selected in relation to the information that has been collected and/or stored in advance.

The device 102 may decide which network to employ for an application on the basis of availability, costs, reliability, as well as other factors including user preference and then initiates communications for the application with the chosen network at communication operation 418. As with the example of FIG. 4A, two networks may look equally suitable for the selected application but the user or the entity operating the native network for the device 102 may have set a priority that instructs the device 102 to pick one of the two networks over the other. Furthermore, the associated network may be a native or roaming network, or the device 102 may be restricted to only a native network or to a limited set of roaming networks. The association of the selected application to a particular network may be stored in the memory 204 of the device 102 for subsequent reference upon a subsequent invocation of the application or the device 102 may discard the association and re-analyze the networks and their suitability the next time this application is invoked.

As the second option, the device 102 may query for dynamic information from networks in range at query operation 420 upon receiving the selection of the application to invoke. For example, the device 102 and the networks may be configured so that no information about available services is exchanged until the application is invoked such that the device does not receive the dynamic information at information operation 412. Furthermore, the query 420 may be specific to the selected application, such as querying each network for its current information for the service to be used by the application. For example, upon a web browser being selected by a user, the device 102 may query each network in range for its current data throughput and its current cost per unit of data transferred. Thus, the query here may involve less information exchange than for a situation where the device 102 obtains all of the dynamic information a network has about every service the network offers.

In this second option, after having queried the networks for their information that pertains to service for the current application, the device 102 then analyzes the information that has been received at analysis operation 416. The device 102 then chooses a network and initiates communications for the selected application with the chosen network at communication operation 418 as discussed above in relation to the first option of FIG. 4B.

These logical operations of FIG. 4B repeat so that upon encountering new networks, information is received at information operation 412 and upon invocation of an application at selection operation 414, the best suited network is then chosen. Thus, it can be seen that in the example of FIG. 4B, the device 102 may have many applications simultaneously in use and may be simultaneously communicating with multiple networks to satisfy the communication needs of those applications.

Figure 5:
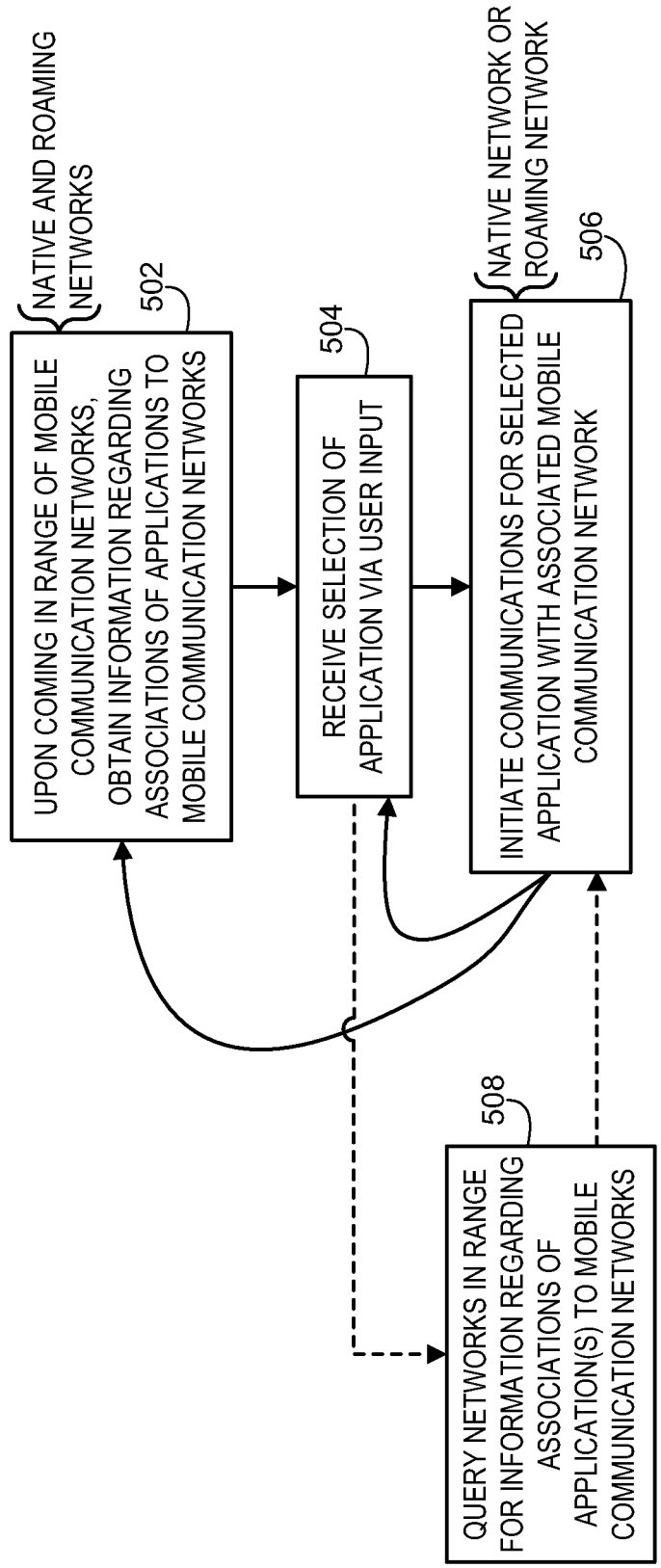
FIG. 5 shows examples of logical operations that may be performed by a communication device to obtain a selection of communication networks for applications.

FIG. 5 shows another example of logical operations that may be performed by the communication device 102. In this example, the device 102 does not employ logic for analyzing the dynamic information of available networks in order to choose a best suited network for an application. Instead, the device 102 obtains information from one or more networks regarding what the associations of networks to applications should be. Two separate options are shown in FIG. 5 in relation to obtaining information from the networks that are in range, where either or both may be employed in this particular example. The first option is shown with solid connecting arrows of the logical flow while the second option includes the dashed connecting arrows of the logical flow.

Initially and according to the first option, the communication device 102 is brought into range of one or more communication networks, or is brought into range of additional communication networks at information operation 502. In this example, the networks may be the native network(s) for the device 102, if any are in range, as well as any roaming networks for the device that are in range. In alternative embodiments, the device 102 may obtain such information only from native networks. Upon encountering these networks, the device 102 may query for application-to-network association information and/or the networks may be configured to submit such information as an automatic function upon initial communication with the device 102. In either case, application-to-network information is provided from one or more networks to the device 102.

The information received may include data identifying which network should be used for certain applications in order to provide the applications with the necessary communication services. This information may be provided entirely by a native network of the device 102. Alternatively, other networks including roaming networks may provide this information, such as where a native network is unavailable or is otherwise incapable of providing the associations to the device 102.

According to various embodiments, the dynamic information of the embodiment of FIG. 5 may also include some or all of the dynamic information discussed above in relation to FIGS. 4A and 4B, such as the services of each network that are available to support applications, dynamic information specifying a quality of service of each supported application, the current cost associated with using a service of the network to support a particular application, the reliability of the connection to the service of the network to support a particular application, and so on. According to some embodiments, the device 102 may utilize this dynamic information to supplement the associations that are being received. For example, the device 102 may use such dynamic information to choose a network for an application where no association has been provided from the network or on local storage. As another example, the device 102 may use such dynamic information to choose a network for an application where multiple networks have been suggested by the one or more networks that are sending the associations to the device 102.

After receiving this dynamic information in accordance with the first option of FIG. 5, the device 102 then invokes an application, such as at the request of the user or in the normal course of operation of the device 102, at selection operation 504. At this point the device 102 may have already received an association of a network to the selected application. Therefore, according to the first option, the device 102 then initiates communications for the application with the chosen network at communication operation 506.

As the second option, the device 102 may query for dynamic information from networks in range at query operation 508 upon receiving the selection of the application to invoke. For example, the device 102 and the networks may be configured so that no application-to-network association information is exchanged until a particular application is invoked such that the device does not receive the dynamic information at information operation 502. Furthermore, the query 508 may be specific to the selected application, such as querying each network until obtaining dynamic information that specifies which network should be used for the selected application. Thus, the query here may involve less information exchange than for a situation where the device 102 obtains all of the potential application-to-network associations.

In this second option, after having queried the networks for their dynamic information specifying one or more associations for the current application, the device 102 then initiates communications for the selected application with the network specified by the application-to-network associations at communication operation 506 as discussed above in relation to the first option of FIG. 5.

These logical operations of FIG. 5 repeat so that upon encountering new networks, dynamic information may be received at information operation 502 to specify new associations, and upon invocation of an application at selection operation 504 the best suited network is then chosen. Thus, it can be seen that in the example of FIG. 5, as with the previous examples, the device 102 may have many applications simultaneously in use and may be simultaneously communicating with multiple networks to satisfy the communication needs of those applications.

In each of the preceding examples of FIGS. 4A, 4B, and 5, it will be appreciated that the logical operations may be re-iterated for one or more applications of the device 102 in order to again determine which network should be in use for the one or more applications. For example, the re-iteration may be triggered by the passing of a particular period of time that may be set for the device 102, set for an application, or set for the network being used for an application. Furthermore, it will be appreciated that the logical operations may be re-iterated as triggered by a change of circumstances of the device 102, such as moving to a new area with different networks, or movement of the device 102 that leads to a change in sending/receiving qualities, and so forth.

Furthermore, it will be appreciated that for at least some embodiments, the device 102 may implement logical operations from any one or all of the preceding examples of FIGS. 4A, 4B, and 5 as well as other examples. For instance, the device 102 may rely upon its own analysis in advance of selection of applications of a first set as in FIG. 4A to select a network for those applications of the first set, while relying upon its own analysis at the time of selection of an application of a second set as in FIG. 4B, while relying on associations sent from the networks to select a network for other applications of a third set as in FIG. 5.

In some embodiments, it may be desirable to have a hybrid approach whereby operations such as those of FIG. 4A or 4B are used to determine a network for one direction of communication with the communication device 102 while operations such as those of FIG. 5 are used to determine a network for the opposite direction of communication with the communication device 102. For example, the communication device 102 may employ logical operations such as those of FIG. 4A or 4B to perform an analysis that determines which network to receive communications from for one or more applications. In this example, the communication device may employ logical operations such as those of FIG. 5 in order to request instructions from the networks regarding which network to transmit to. Thus, an asymmetric transmit/receive path may be achieved according to various embodiments.

Figure 6A:
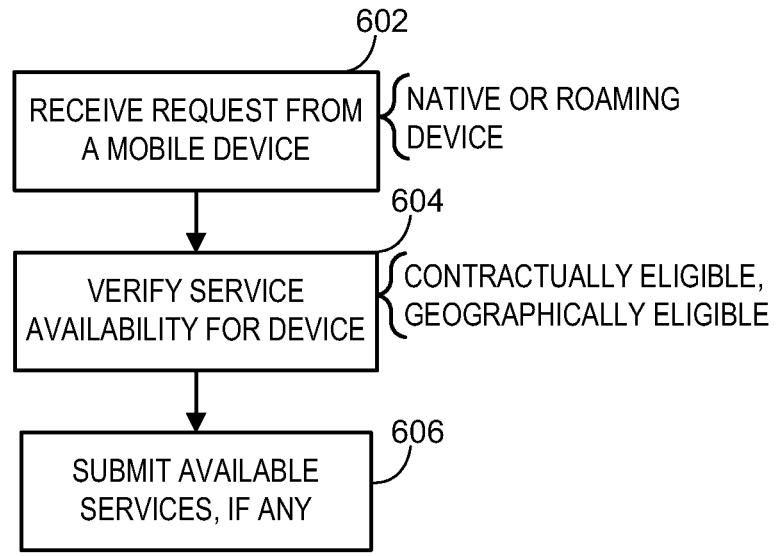
FIG. 6A shows examples of logical operations that may be performed by a communication network to respond to a communication device regarding service availability.

FIG. 6A shows one example of logical operations that may be performed by a communication network, such as the network 124, to provide information about the services it offers and any additional dynamic information that may be used by the communication device 102 to determine whether the network 124 should be selected for an application. At request operation 602, the network 124 receives a request from the device 102 to establish at least a minimal amount of communication with the device 102 in order to exchange system level information such as the dynamic information about services that are available from the network. The device 102 presents its credentials at this initial request and the network 124 uses those credentials to determine if the device 102 is a native device, a roaming, device, and whether service to the device is legitimate based on underlying agreements with the device owner in the case of a native device or with a native network of the device in the case of a roaming device.

Upon receiving the initial request and the credentials from the device 102, the network 124 attempts to verify service availability for the device at service operation 604. Here, the network 124 may perform various look-ups of databases and other information sources to determine if the device 102 is contractually eligible for any services and is geographically eligible for those services. For instance, contractual eligibility may exist on the basis of the device 102 being a native device with a service plan with the network 124 or on the basis of the device 102 being a roaming device where the native network for the device has a roaming agreement for at least some services with the present network. Geographical eligibility may exist on the basis of which antenna and tower the device 102 is currently communicating with since a network may offer certain services only in certain geographical areas and through certain towers.

Upon the network 124 determining whether the device 102 is eligible for any services that the network offers, the network then communicates the dynamic information about those services to the device 102 at submission operation 606. This dynamic information may include the information discussed above in relation to FIGS. 4A and 4B that the device 102 then analyzes to make a choice of network(s) for each application.

Figure 6B:
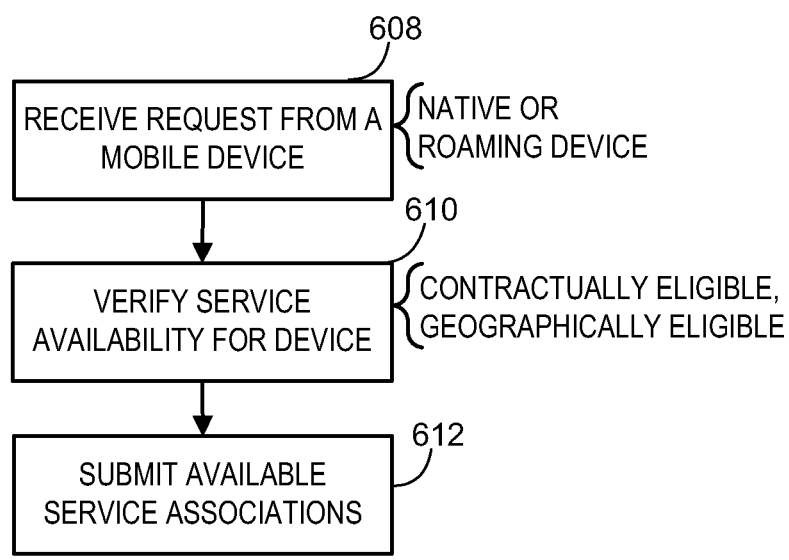
FIG. 6B shows examples of logical operation that may be performed by a communication network to respond to a communication device regarding associations of networks to applications.

FIG. 6B shows another example of logical operations that may be performed by a communication network, such as the network 124, to provide dynamic information about associations of services it or other networks may offer relative to applications of the device 102. At request operation 608, the network 124 receives a request from the device 102 to establish at least a minimal amount of communication with the device 102 in order to exchange system level information such as the dynamic information about associations of applications to services that are available from the network 124. The device 102 presents its credentials at this initial request and the network 124 uses those credentials to determine if the device 102 is a native device, a roaming device, and whether service to the device is legitimate based on underlying agreements with the device owner in the case of a native device or with a native network of the device in the case of a roaming device.

Upon receiving the initial request and the credentials from the device 102, the network 124 attempts to verify service availability for the device at service operation 610. Here, the network 124 may perform various look-ups of databases and other information sources to determine if the device 102 is contractually eligible for any services and is geographically eligible for those services. The native network may perform such look-ups for dynamic information about services this native network may offer but also about services other native networks and/or roaming networks may offer.

Upon the network 124 determining whether the device 102 is eligible for any services that this or other networks may offer, the network then communicates the application-to-network association information to the device 102 at submission operation 612. This information includes the pre-established associations of applications of the device 102 to networks but may also include the dynamic information discussed above in relation to FIGS. 4A and 4B that the device 102 then analyzes to make a choice of network(s) for each application in case the pre-established associations are inadequate for reasons discussed above.

To further illustrate the application of embodiments discussed above in relation to FIGS. 4A-6, one specific example is where the communication device 102 wants to make a call and also wants to stream video. The communication device 102 may use a native network to make the phone call, but determines that the data service (e.g., EDGE) is not available or oversubscribed in the current geographic location of the communication device 102 based on the dynamic information that has been received. So, in that case, the communication device 102 establishes a roaming connection to another available network that does support EDGE.

Alternately, in another specific example, a communication device 102 that has a discovered a native GSM connection and also an 802.11 home network connection may determine that it is desirable to stream video using the 802.11 home network because doing so is cheaper than using the native GSM connection based on information that has been received dynamically or has been stored in advance. However, the communication device 102 may find that it needs to use GSM for phone calls because the 802.11 home network has too much latency to support a desired quality voice experience based on the dynamic information that has been received.

Thus, it can be seen that the single communication device 102 may communicate with multiple networks to obtain the best service available for the applications that the device 102 provides. Accordingly, customers may benefit from an increased level of performance, reliability, cost-savings, and so forth by utilizing a device 102 that communicates with these multiple networks.

While embodiments have been particularly shown and described, it will be understood by those skilled in the art that various other changes in the form and details may be made therein without departing from the spirit and scope of the invention.

What is claimed is:

1. A communication device, comprising:
   a processor; and
   a memory containing instructions which, when executed by the processor, cause the processor to perform operations comprising:
   a) obtaining dynamic information specifying signal characteristics of a plurality of communication networks as the communication device comes within range of the plurality communication networks, wherein the dynamic information includes a command to select a particular communication network for a particular application;
   b) analyzing the dynamic information in relation to a plurality of applications by applying rules to make a determination on an application-by-application basis as to which communication network is suitable to utilize to execute an application;
   c). associating particular applications among the plurality of applications with particular communication networks among the plurality of communication networks, based on the communication networks determined to be suitable to utilize to execute the particular applications; and
   d). storing, the associations of the particular applications with the particular communication networks prior to invoking the particular applications,
   wherein the operation in step a) through d) are automatically repeated as the communication device detects a new communication network within range.

2. The communication device of claim 1, further comprising a first transceiver in communication with a first communication network and a second transceiver in communication with a second communication network while the first transceiver is in communication with the first communication network.

3. The communication device of claim 1, wherein the instructions, when executed by the processor, cause the processor to determine that communications of a first application occur via a first communication network and to determine that communications of a second application occur via a second communication network.

4. The communication device of claim 3, wherein the first application is a voice call application and wherein the second application is a data application.

5. The communication device of claim 3, wherein the first communication network is a native network to the communication device and wherein the second communication network is a roaming network to the communication device.

6. The communication device of claim 3, wherein the first communication network and the second communication network are native networks to the communication device.

7. The communication device of claim 1, wherein the processor receives the dynamic information, including the command to select a particular communication network for a particular application, from a communication network among the plurality of communication networks and the instructions, when executed by the processor, cause the processor to make the determination based on the received information.

8. The communication device of claim 1, wherein the dynamic information comprises at least one of cost information, data throughput information, and quality of service information.

9. The communication device of claim 1,
wherein the memory further contains instructions which, when executed by the processor, cause the processor to perform
causing communications to be established for a particular application with a particular communication network of the plurality based on the determination.

10. The communication device of claim 1, wherein the dynamic information instructs the processor to utilize a first communication network and a second communication network as a bonded network connection for a first application.

11. The communication device of claim 10, wherein the dynamic information instructs the processor to utilize the bonded network connection for a second application.

12. The communication device of claim 10, wherein the first communication network is a native network to the communication device and wherein the second communication network is a roaming network to the communication device.

13. The communication device of claim 1, wherein if the processor determines that more than one communication network is suitable to utilize for an application, the processor determines the communication network to utilize based on a preset priority of a communication network over another communication network.

14. The communication device of claim 1, wherein the associations of the particular applications with the particular communication networks are stored prior to receiving a request to invoke the particular applications.

15. A non-propagating computer readable medium containing instructions that, when executed by a processor in a communication device, cause the processor to perform operations comprising:
a) obtaining dynamic information that specifies signal characteristics for a plurality of communication networks from a communication network among the plurality of communication networks as the communication device comes within range of the plurality communication networks, wherein the dynamic information includes a command to select a particular communication network for a particular application;
b) analyzing the dynamic information in relation to a plurality of applications by applying rules to make a determination on an applications-by-application basis as to which communication network is suitable to utilize to execute an application;
c) associating particular applications among the plurality of applications with particular communication networks among the plurality of communication networks, based on the communication networks determined to be suitable to utilize to execute the applications; and
d). storing the associations of the particular applications with the particular communication networks prior to invoking the particular applications, wherein the operations in step a) through d) are automatically repeated as the communication device detects a new communication network within range.

16. The non-propagating computer readable medium of claim 15, wherein the dynamic information instructs the processor to utilize a first communication network for a first application and to utilize a second communication network for a second application.

17. The non-propagating computer readable medium of claim 15, wherein the instructions further comprise instructions which when executed by the processor, cause the processor to perform utilizing the dynamic information to select among the plurality of communication networks a best communication network for purposes of communicating for an application of the communication device.

18. The non-propagating computer readable medium of claim 15, wherein the instruction further comprise instructions which, when executed by the processor, cause the processor to perform causing communications to be established with a first communication network for a first application while causing communications to be established with a second communication network for a second application.

19. The non-propagating computer readable medium of claim 18, wherein the first communication network is a native network for the communication device and wherein the second communication network is a roaming network for the communication device.

20. A method performed by a wireless communication device, comprising:
a) obtaining dynamic information at that specifies signal characteristics for a plurality of communication networks from a communication network among the plurality of communication networks as the communication device comes within range of the communication networks, wherein the dynamic information includes a command to select a particular communication network for a particular application;
b) analyzing, by a processor, the dynamic information in relation to a plurality of applications by applying rules to make a determination on an application-by-application basis as to which communication network is suitable to utilize to execute an application;
c) associating, by the processor, particular applications among the plurality of applications with particular communication networks among the plurality of communication networks, based on the communication networks determined to be suitable to utilize to execute the applications; and
d) storing the associations of the particular applications with the particular communication networks prior to invoking the particular applications, wherein steps a) through d) are automatically repeated as the communication device detects a new communication network within range.

* * * * *